United States Patent
McDaniel et al.

(10) Patent No.: US 10,214,674 B2
(45) Date of Patent: Feb. 26, 2019

(54) WEIGHTED WELL FLUIDS

(71) Applicant: Halliburton Energy Services, Inc., Houston, TX (US)

(72) Inventors: Cato Russell McDaniel, Montgomery, TX (US); Dale E. Jamison, Humble, TX (US); William Walter Shumway, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/771,907

(22) PCT Filed: May 15, 2014

(86) PCT No.: PCT/US2014/038188
§ 371 (c)(1),
(2) Date: Sep. 1, 2015

(87) PCT Pub. No.: WO2015/174986
PCT Pub. Date: Nov. 19, 2015

(65) Prior Publication Data
US 2016/0122614 A1 May 5, 2016

(51) Int. Cl.
*C09K 8/06* (2006.01)
*C09K 8/08* (2006.01)
(Continued)

(52) U.S. Cl.
CPC .......... *C09K 8/06* (2013.01); *C09K 8/03* (2013.01); *C09K 8/08* (2013.01); *C09K 8/12* (2013.01); *C09K 8/36* (2013.01); *C09K 2208/18* (2013.01)

(58) Field of Classification Search
None
See application file for complete search history.

(56) References Cited

U.S. PATENT DOCUMENTS 3,275,551 A * 9/1966 Annis ............. C09K 8/28
175/65
4,080,421 A 3/1978 Kasserra
(Continued)

FOREIGN PATENT DOCUMENTS

| EP | 0652272 A1 | 5/1995 |
|---|---|---|
| WO | 2012-152889 A1 | 11/2012 |

OTHER PUBLICATIONS

International Search Report and Written Opinion dated Feb. 24, 2015 in International Application No. PCT/US2014/038188.
(Continued)

*Primary Examiner* — Jeffrey D Washville
(74) *Attorney, Agent, or Firm* — Polsinelli PC

(57) ABSTRACT

Fluids and methods of making and using the fluids that include, for example, well bore treatment fluids, kill fluids, packer fluids, thermal insulating fluids and the like that contain soluble weighting material. The fluids include: (a) an aqueous solvent such as water, and optionally one or more water-miscible organic liquids; and (b) one or more organic cationic tungstates, molybdates, and/or silicates dissolved in the solvent. In some cases, the fluids are substantially free of lithium (Li), sodium (Na), potassium (K), rubidium (Rb), cesium (Cs), and francium (Fr) salts and/or ions. The fluid may also be an oil-based emulsion including the aqueous-based fluid. Methods of making and using both the aqueous fluids and oil-based emulsions are also disclosed.

19 Claims, 1 Drawing Sheet

(51) Int. Cl.
*C09K 8/12* (2006.01)
*C09K 8/36* (2006.01)
*C09K 8/03* (2006.01)

(56) References Cited

U.S. PATENT DOCUMENTS

| | | |
|---|---|---|
| 4,120,369 A | 10/1978 | Fischer et al. |
| 4,557,718 A | 12/1985 | Kamps et al. |
| 4,623,021 A | 11/1986 | Stowe |
| 4,816,303 A * | 3/1989 | Kroenke ............... C09K 8/54 106/14.15 |
| 7,273,832 B2 | 9/2007 | Benton et al. |
| 2008/0135302 A1* | 6/2008 | Zhang ................... C09K 8/06 175/70 |
| 2008/0223596 A1* | 9/2008 | Ezell ..................... C09K 8/44 174/30 |
| 2010/0210486 A1 | 8/2010 | Horton et al. |
| 2010/0305010 A1 | 12/2010 | Falana et al. |
| 2011/0247986 A1 | 10/2011 | Zhang et al. |

OTHER PUBLICATIONS

Non-Final Office Action; U.S. Appl. No. 14/783,798; dated Nov. 29, 2017.
Final Office Action; U.S. Appl. No. 14/783,798; dated May 16, 2018.

\* cited by examiner

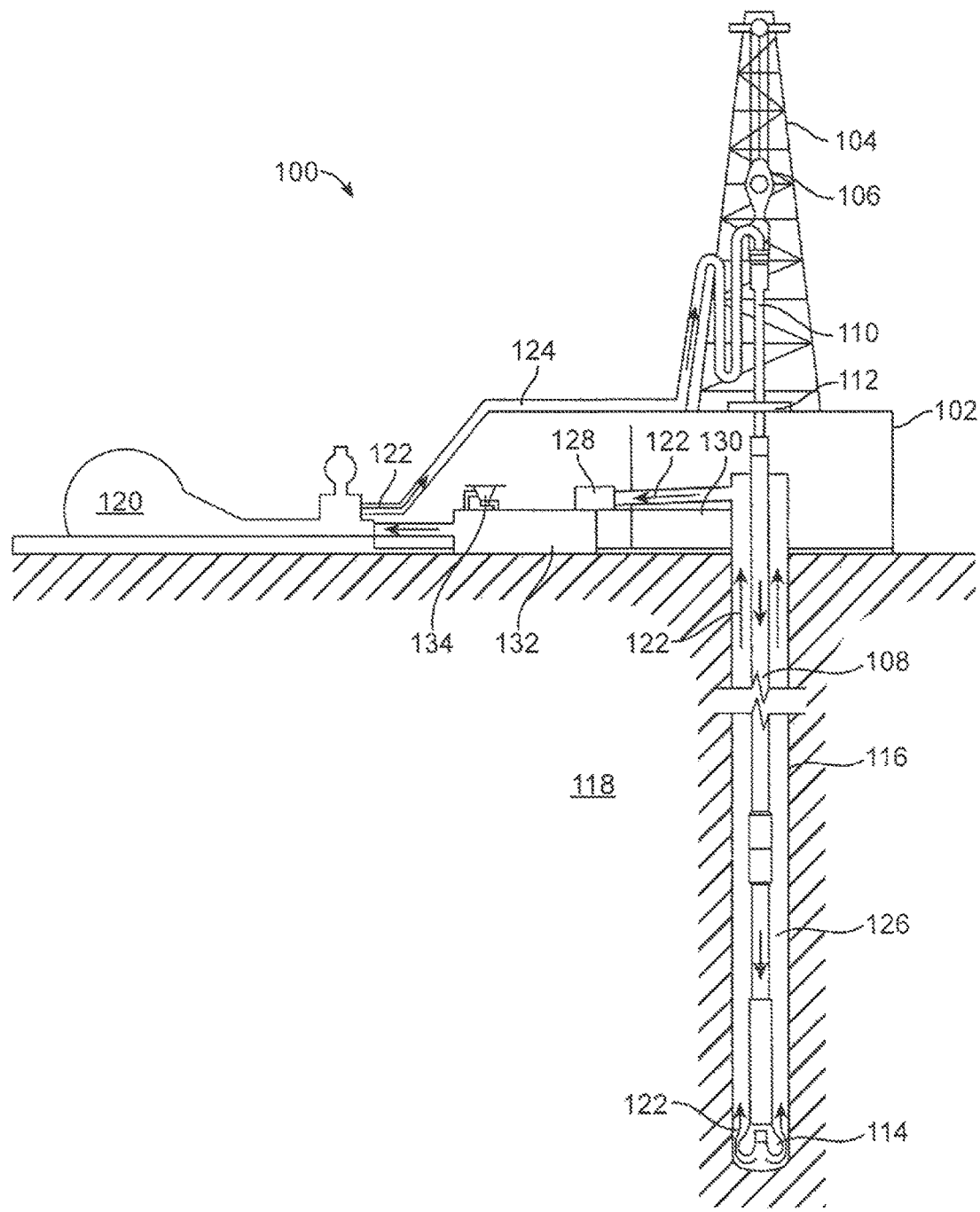

WEIGHTED WELL FLUIDS

CROSS-REFERENCE TO RELATED APPLICATIONS

This application is a national stage entry of PCT/US2014/038188 filed May 15, 2014, said application is expressly incorporated herein in its entirety.

FIELD

The present disclosure relates to fluids, such as well bore treatment fluids, kill fluids, packer fluids, thermal insulating fluids and the like that contain soluble weighting material and can be used to replace conventional fluids that contain cesium formate. Also disclosed are methods of making and using the fluids.

BACKGROUND

In geotechnical engineering various types of fluids are needed. These fluids include, but are not limited to, well bore treatment fluids, kill fluids, packer fluids, and thermal insulating fluids. For example, when drilling an oil or gas well, drilling fluid is used to aid the drilling of boreholes into the earth. Drilling fluids are also used for much simpler boreholes, such as water wells. Liquid drilling fluid is often called drilling mud. The three main categories of drilling fluids are water-based fluids (which can be dispersed and non-dispersed), non-aqueous fluids, often called oil-based mud, and gaseous drilling fluid, in which a wide range of gases can be used.

The main functions of drilling fluids include providing hydrostatic pressure to prevent formation fluids from entering into the well bore, keeping the drill bit cool and clean during drilling, carrying out drill cuttings, and suspending the drill cuttings while drilling is paused and when the drilling assembly is brought in and out of the hole. The drilling fluid used for a particular job is selected to avoid formation damage and to limit corrosion.

Agents for lubrication are often included in the fluid as well as weighting materials in order to achieve a density such that the hydraulic pressure of the fluid is typically greater than the surrounding pressure in the well bore. Furthermore, when fluids are used during drilling, the fluid often contains drilling fines, such as shale and sandstone fines. During the drilling operations and afterwards, a filter cake seals the formation surface of the well bore so that the well bore can be completely formed without any leakage from the formation surface into the well bore and/or without any leakage of the drilling fluids into the formation surface.

A well kill is the operation of placing a column of heavy fluid into a well bore in order to prevent the flow of reservoir fluids without the need for pressure control equipment at the surface. It works on the principle that the weight of the fluid, i.e., the "kill fluid" or "kill mud," will be enough to suppress the pressure of the formation fluids.

Packing and insulating fluids are also often used in subterranean operations. These fluids are usually placed into an annulus between a first tubing and a second tubing or the walls of a well bore. The fluid acts to insulate a first fluid (e.g., a hydrocarbon fluid) that may be located within the first tubing from the environment surrounding the first tubing or the second tubing to enable optimum recovery of the hydrocarbon fluid. For instance, if the surrounding environment is very cold, the fluid protects the first fluid in the first tubing from the environment so that it efficiently flows through the production tubing, e.g., the first tubing, to other facilities. This is desirable because heat transfer can cause problems such as the precipitation of heavier hydrocarbons, severe reductions in flow rate, and in some cases, casing collapse. Additionally, when used in packer applications, a required amount of hydrostatic head pressure is needed. Thus, higher density fluids are often used to provide the requisite hydrostatic force.

Once a drilling operation has been completed, the well is prepared for the completion operations whereby the fluids used for drilling are typically displaced by a completion fluid. Completion fluids are usually formulated to the same density as the fluid used to drill the well in order to retain the hydraulic pressure on the well bore.

Cesium formate is often used in wellbore fluids because it is extremely soluble in water. Nonetheless, cesium formate is expensive, can cause corrosion problems such as hydrogen stress corrosion cracking and hydrogen embrittlement, and is not always sufficient to weight up the fluid. Localized corrosion, pitting and stress corrosion cracking are particularly problematic and related to a high risk of unpredictable and rapid failure of metal integrity. Pitting corrosion and stress corrosion cracking are common and frequently occur in well tubulars constructed from so-called corrosion resistant alloys. Corrosion inhibitors have little or no effect and can actually initiate corrosion. Hydrogen embrittlement is a brittle mechanical fracture of high-strength steels caused when atomic hydrogen dissolves in the crystal structure of a metal rather than forming hydrogen gas. It typically occurs in corrosive environments under constant tensile stress, similar to hydrogen stress corrosion cracking. The most common form is sulphide stress cracking, which occurs when stressed metal is exposed to water containing hydrogen sulphide or other sulphur compounds, generally under aerobic conditions.

BRIEF DESCRIPTION OF THE DRAWINGS

These drawings illustrate certain aspects of some of the embodiments of the present method, and should not be used to limit or define the disclosed fluids or methods of using the disclosed fluids.

The FIGURE illustrates a system for drilling a wellbore.

DETAILED DESCRIPTION

The present disclosure relates to fluids, such as well bore treatment fluids, kill fluids, packer fluids, thermal insulating fluids and the like that contain soluble weighting agent material and can be used to replace conventional fluids containing cesium formate. Solid weighting agents are not excluded from the disclosure and are in fact, in some embodiments, included in the fluids described herein. The fluids are particularly useful in reducing problems associated with hydrogen embrittlement and stress corrosion cracking.

The fluids may be aqueous-based, and comprise: (a) an aqueous solvent, and optionally one or more water-miscible organic liquids; and (b) one or more organic cationic tungstates, molybdates, and/or silicates dissolved in the solvent; and optionally one or more lithium (Li), sodium (Na), potassium (K), rubidium (Rb), cesium (Cs), and francium (Fr) salts and/or ions. In some embodiments, the fluids are generally substantially free of lithium (Li), sodium (Na), potassium (K), rubidium (Rb), cesium (Cs), and francium (Fr) salts and/or ions. The organic cations of the cationic tungstates, molybdates, and/or silicates are typically cationic amines, cationic polyamines, ammonium compounds, phosphonium compounds, and/or amine oxides. In certain embodiments, the organic cations of the cationic tungstates, molybdates, and/or silicates are amine and/or ammonium cations. For example, the amine and/or ammonium cations may be aliphatic amines, hydroxyl amines, polyamines, guanidine and/or guanidine derivatives. More specifically, the amine and/or ammonium cations may be ethanolamine, diethanolamine, triethanolamine, ethylenediamine, diethylenetriamine, triethylenetetramine, guanidine and guanidine derivatives, and hydroxylamine and hydroxylamine derivatives.

In addition to the advantages of organic cationic salts of tungstates, molybdates, and silicates as weighting agents, in various embodiments the organic cations may have the added benefit of acting as corrosion inhibitors and shale stabilizers, including in particular embodiments cationic amines and phosphonates. The inhibition of corrosion is of relevant advantage in high-salt environments. In various embodiments, organic cations may also provide the advantage of monitoring of their concentrations by titration or colorimetric detection techniques.

The water-miscible organic liquids that may be included in the packing fluids of the present disclosure include, but are not limited to, water-miscible materials having relatively low thermal conductivity, including but not limited to materials being about half as conductive as water or less. By "water-miscible," it is meant that about 5 grams or more of the organic liquid will disperse in 100 grams of water. Suitable water-miscible organic liquids include, but are not limited to, esters, amines, alcohols, polyols, glycol ethers, or combinations and derivatives of these. Examples of suitable esters include low molecular weight esters; specific examples include, but are not limited to, methylformate, methyl acetate, and ethyl acetate. Examples of suitable amines include low molecular weight amines; specific examples include, but are not limited to, diethyl amine, 2-aminoethanol, and 2-(dimethylamino)ethanol. Examples of suitable alcohols include methanol, ethanol, propanol, isopropanol, and the like. Examples of glycol ethers include ethylene glycol butyl ether, diethylene glycol methyl ether, dipropylene glycol methyl ether, tripropylene glycol methyl ether, and the like. Of these, polyols are useful since they often exhibit greater thermal and chemical stability, higher flash point values, and are more benign with respect to elastomeric materials.

Suitable polyols include aliphatic alcohols containing two or more hydroxy groups. In some embodiments, the polyol is at least partially water-miscible. Examples of suitable polyols include, but are not limited to, water-soluble diols such as ethylene glycols, propylene glycols, polyethylene glycols, polypropylene glycols, diethylene glycols, triethylene glycols, dipropylene glycols and tripropylene glycols, combinations of these glycols, their derivatives, and reaction products formed by reacting ethylene and propylene oxide or polyethylene glycols and polypropylene glycols with active hydrogen base compounds (e.g., polyalcohols, polycarboxylic acids, polyamines, or polyphenols).

Other glycols include neopentyl glycol, pentanediols, butanediols, and such unsaturated diols as butyne diols and butene diols. In addition to the diols, the triol, glycerol, and such derivatives as ethylene or propylene oxide adducts may be used. Other higher polyols may include pentaerythritol. Another class of polyhydroxy alcohols contemplated is the sugar alcohols. The sugar alcohols are obtained by reduction of carbohydrates and differ greatly from the above-mentioned polyols. Combinations and derivatives of these are suitable as well.

The choice of polyol to be used is largely dependent on the desired density of the fluid. For higher density fluids, a higher density polyol may be used, for instance, triethylene glycol or glycerol are useful in some embodiments. For lower density applications, ethylene or propylene glycol may be used. In some embodiments, more salt may be needed to adequately weight the fluid to the desired density. In certain embodiments, the amount of polyol that should be used may be governed by the thermal conductivity ceiling of the fluid and the desired density of the fluid. If the thermal conductivity ceiling is 0.17 BTU/hft° F., then the concentration of the polyol may be from about 40% to about 99%. The range may also be from about 70% to about 99%.

The one or more amine or ammonium tungstates, molybdates, and/or silicates in the aqueous-based fluids are, in some embodiments, in an amount such that the density of the aqueous-based fluid compositions are from about 7 to about 22 lbs/gal, from about 10 to about 20 lbs/gal, or from about 15 to about 20 lbs/gal.

In some embodiments the aqueous-based fluid has a pH of from about 7 to about 13, or from about 8 to about 11. Buffers may be used in some embodiments to help maintain and/or achieve an appropriate pH. For example, one or more of the following buffers may be included in the packing fluid: a citrate salt, borax, triethanolamine, triethylene pentamine, diethylenetriamine, an acetate salt, a propionate salt, a succinate salt, an adipate salt, $H_3BO_3$, ethanolamine, N-Tris(hydroxymethyl)methyl-3-aminopropanesulfonic acid (TAPS), bicine, and N-cyclohexyl-2-aminoethanesulfonic acid (CHES), trisodium phosphate, sodium bicarbonate, sodium carbonate, potassium carbonate, tripotassium phosphate, and/or potassium bicarbonate.

The fluids of the instant disclosure may contain one or more hydrogen sulfide scavengers. Examples of hydrogen sulfide scavengers include, but are not limited to, an amine, a polyamine, an aldehyde, ferrous gluconate, iron oxide, copper carbonate, hydrogen peroxide, zinc oxide, zinc carbonate, and zinc carbonate.

In some embodiments, the fluids of the instant disclosure further comprise one or more polymers. Examples of polymers include, but are not limited to, acrylic acid polymers, acrylic acid ester polymers, acrylic acid derivative polymers, acrylic acid homopolymers, acrylic acid ester homopolymers (such as poly(methyl acrylate), poly(butyl acrylate), and poly(2-ethylhexyl acrylate)), acrylic acid ester co-polymers, methacrylic acid derivative polymers, methacrylic acid homopolymers, methacrylic acid ester homopolymers (such as poly(methyl methacrylate), polyacrylamide homopolymer, n-vinyl pyrolidone and polyacrylamide copolymers, poly(butyl methacrylate), and poly(2-ethylhexyl methacrylate)), n-vinyl pyrolidone, acrylamido-methyl-propane sulfonate polymers, acrylamido-methyl-propane sulfonate derivative polymers, acrylamido-methyl-propane sulfonate co-polymers, and acrylic acid/acrylamido-methyl-propane sulfonate copolymers, and combinations thereof. Copolymers and terpolymers may be suitable as well. Mixtures of any of these polymers may be suitable as well. In some embodiments, the polymer should be at least partially water soluble. The polymers can be cationic, anionic, nonionic, or zwitterionic. In certain embodiments, the polymer is in an amount of from about 0.1% to about 15% weight of the fluid, from about 0.5 wt. % to about 8 wt. %, 0.5 wt. % to 6 wt. %, or from about 0.5 wt. % to about 4 wt. %, based on the total weight of the fluid.

To obtain a desired gel characteristic and thermal stability of the fluids of the present disclosure, the polymer included in the fluid may be cross-linked by an appropriate crosslinking agent. In those embodiments of the instant disclosure wherein it is desirable to crosslink the polymer, optionally, one or more crosslinking agents may be added to the fluid to crosslink the polymer. One type of suitable crosslinking agent is a combination of a phenolic component (or a phenolic precursor) and formaldehyde (or formaldehyde precursor). Suitable phenolic components or phenolic precursors include, but are not limited to, phenols, hydroquinone, salicylic acid, salicylamide, aspirin, methyl-p-hydroxybenzoate, phenyl acetate, phenyl salicylate, o-aminobenzoic acid, p-aminobenzoic acid, m-aminophenol, furfuryl alcohol, and benzoic acid. Suitable formaldehyde precursors may include, but are not limited to, hexamethylenetetramine, glyoxal, and 1,3,5-trioxane. This crosslinking agent system usually needs approximately 250° F. to thermally activate to crosslink the polymer. Another type of suitable crosslinking agent is polyalkylimine. This crosslinking agent usually needs approximately 90° F. to activate to crosslink the polymer. This crosslinking agent may be used alone or in conjunction with any of the other crosslinking agents discussed herein.

Another type of crosslinking agent that may be used includes non-toxic organic crosslinking agents that are free from metal ions. Examples of such organic cross-linking agents are polyalkyleneimines (e.g., polyethyleneimine), polyalkylenepolyamines and mixtures thereof. In addition, water-soluble polyfunctional aliphatic amines, arylalkylamines and heteroarylalkylamines may be utilized.

When included, suitable crosslinking agents may be present in the fluids of the present disclosure in an amount sufficient to provide the desired degree of crosslinking. In certain embodiments, the crosslinking agent or agents may be present in an amount in the range of from about 0.0005% to about 10% weight by volume of the fluid. In certain embodiments, the crosslinking agent may be present in the range of from about 0.001% to about 5% weight by volume of the fluid. One of ordinary skill in the art, with the benefit of this disclosure, will recognize the appropriate amount of crosslinking agent to include based on, among other things, the temperature conditions of a particular application, the type of polymer(s) used, the molecular weight of the polymer(s), the desired degree of viscosification, and/or the pH of the fluid.

In some embodiments, the fluids of the instant disclosure include one or more solid weighting agents. Examples of solid weighting agents include, but are not limited to, barite, hematite, calcium carbonate, magnesium carbonate, iron carbonate, zinc carbonate, manganese tetraoxide, and ilmenite.

The instant disclosure is also directed to fluids that are oil-based emulsions. As mentioned above, the fluids may be a well bore treatment fluid, a kill fluid, a packer fluid, or a thermally insulating fluid. The oil-based emulsion typically comprise: (a) an oily phase; and (b) an aqueous-based fluid such as those described herein. The oily phase of the oil-based emulsions typically comprises at least one hydrocarbon-based oil. Examples of hydrocarbon-based oils include, but are not limited to, diesel oil, crude oil, vegetable oils, synthetic oils such as paraffin oils, olefin oils, and esters.

The oil-based emulsions typically include one or more emulsifiers. Examples of emulsifiers include, but are not limited to, a dimer trimer acid, imadazoline, tall oil, oxidized tall oil, oxidized rosin acids, fatty amids, fatty polyamids, ether carboxylic acids, sulfonic acids, and fatty betaines.

The instant disclosure also relates to methods of drilling a well in a subterranean zone comprising drilling the well in the presence of fluid as described herein. The instant disclosure also encompasses methods forming a fluid, such as a packing or insulating fluid. In one embodiment, the method comprises:
(a) providing an aqueous solvent, and optionally one or more water-miscible organic liquids;
(b) dissolving one or more organic cationic tungstates, molybdates, and/or silicates in the solvent;
(c) adding one or more polymers to the solvent and allowing the polymer(s) to hydrate;
(d) optionally adding a crosslinking agent to crosslink the polymer;
(e) placing the mixture of components (a), (b), (c), and (d) in a chosen location; and
(f) allowing the mixture to activate and form a gel.

In another embodiment, the method comprises adding one or more lithium (Li), sodium (Na), potassium (K), rubidium (Rb), cesium (Cs), and francium (Fr) salts and/or ions to the solvent.

The method may further involve removing the gel from the chosen location by diluting the crosslinks in the polymer, diluting the structure of the polymer, or by physical displacement. In some embodiments, the fluid is formed at a well-site location, at a pipeline location, on-the-fly at a well site, or off-site and transported to a chosen site for use. Additionally, the methods may include adding one or more additives to the mixture, wherein the one or more additives may include a corrosion inhibitor, a pH modifier, a biocide, glass beads, hollow spheres, hollow microspheres, a rheology modifier, a buffer, a hydrate inhibitor, a breaker, a tracer, an additional weighting agent, a viscosifier, and/or a surfactant.

In one embodiment, the present disclosure relates to a method comprising: providing an annulus between a first tubing and a second tubing; providing a packing fluid as described herein, and placing the packing fluid in the annulus. In another embodiment, the present disclosure relates to a method comprising: providing a tubing containing a first fluid located within a well bore such that an annulus is formed between the tubing and a surface of the well bore; providing a fluid as described herein; and placing the fluid in the annulus. In yet another embodiment, the present disclosure relates to a method comprising: providing a first tubing that comprises at least a portion of a pipeline that contains a first fluid; providing a second tubing that substantially surrounds the first tubing thus creating an annulus between the first tubing and the second tubing; providing a fluid as described herein; and placing the fluid in the annulus.

In another embodiment, the method entails mixing the fluid using mixing equipment and placing the fluid in the subterranean zone, for example, by using pumping equipment.

The exemplary fluids disclosed herein may directly or indirectly affect one or more components or pieces of equipment associated with the preparation, delivery, recapture, recycling, reuse, and/or disposal of the disclosed fluids. For example, and with reference to the FIGURE, the disclosed fluids may directly or indirectly affect one or more components or pieces of equipment associated with an exemplary wellbore drilling assembly 100, according to one or more embodiments. It should be noted that while the FIGURE generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and may be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the disclosure.

One or more of the disclosed fluids may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the disclosed fluids may be added to the drilling fluid 122 at any other location in the drilling assembly 100. In at least one embodiment, for example, there could be more than one retention pit 132, such as multiple retention pits 132 in series. Moreover, the retention put 132 may be representative of one or more fluid storage facilities and/or units where the disclosed fluids may be stored, reconditioned, and/or regulated until added to the drilling fluid 122.

As mentioned above, the disclosed fluids may directly or indirectly affect the components and equipment of the drilling assembly 100. For example, the disclosed fluids may directly or indirectly affect the fluid processing unit(s) 128 which may include, but are not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any fluid reclamation equipment. The fluid processing unit(s) 128 may further include one or more sensors, gauges, pumps, compressors, and the like used store, monitor, regulate, and/or recondition the exemplary fluids.

The disclosed fluids may directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids may also directly or indirectly affect the mixing hopper 134 and the retention pit 132 and their assorted variations.

The disclosed fluids may also directly or indirectly affect the various downhole equipment and tools that may come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids may also directly or indirectly affect any downhole heat exchangers, valves and corresponding actuation devices, tool seals, packers and other wellbore isolation devices or components, and the like associated with the wellbore 116. The disclosed fluids may also directly or indirectly affect the drill bit 114, which may include, but is not limited to, roller cone bits, PDC bits, natural diamond bits, any hole openers, reamers, coring bits, etc.

While not specifically illustrated herein, the disclosed fluids may also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

The terms "comprising," "having," and "including" are used in their open, non-limiting sense.

The terms "a," "an," and "the" are understood to encompass the plural as well as the singular.

The expression "at least one" means one or more and thus includes an individual component as well as mixtures/combinations.

All elements positively set forth herein may be negatively excluded.

To facilitate a better understanding of the present disclosure, the following examples of certain embodiments are given. In no way should the following examples be read to limit, or define, the scope of the disclosure.

Example 1

Water-Based Drilling Fluid

The table below provides a formulation for a water-based drilling fluid. The ammonium tungstate brine is prepared by adding a sufficient amount of ammonium tungstate to water to attain a brine having a specific gravity (SG) of 1.77. The ingredients below are then combined in a batch mixer and stirred until homogenous. The calculated density is 1.8 SG (15.0 lb/gal).

| Ingredient | Purpose/Description | Formulation |
| --- | --- | --- |
| Ammonium Tungstate Brine (SG = 1.7) | Brine made from ammonium tungstate and water | 0.97 bbl/bbl |
| BARABRINE ® DEFOAM | De-foaming agent | 0.02 gal/bbl |
| N-VIS ® | Viscosifier | 1.5 lb/bbl |
| N-DRIL ™ HT PLUS | Fluid Loss Control Agent | 6 lb/bbl |
| BARACARB ® 5 | Calcium Carbonate (weighting/bridging agent) | 10 lb/bbl |

-continued

| Ingredient | Purpose/Description | Formulation |
|---|---|---|
| BARACARB ® 25 | Calcium Carbonate (weighting/bridging agent) | 27.2 lb/bbl |
| OXYGON ® | Oxygen Scavenger | 1 lb/bbl |
| Calculated Density | | 1.80 SG (15.0 lb/gal) |

* bbl/bbl refers to barrel/barrel
* lb/bbl refers to pounds per barrel
* gal/bbl refers to gallons per barrel
* SG refers to Specific Gravity Example 2

Oil-Based Drilling Fluids

The table below provides a formulation for an oil-based drilling fluid. The oil-based drilling fluid is an emulsion that incorporates an aqueous-based fluid (i.e., ammonium tungstate brine having a specific gravity of 2.3). The ammonium tungstate brine is prepared by adding a sufficient amount of ammonium tungstate to water to attain a brine having a specific gravity of 2.3. The ingredients below are then combined in a batch mixer and stirred until homogenous. The calculated density for the oil-based drilling fluid is 1.72 SG (14.25 lb/gal).

| Ingredient | Purpose/Description | Formulation 1 |
|---|---|---|
| Ammonium Tungstate Brine (SG = 2.3) | Brine made from ammonium tungstate and water | 0.58 bbl/bbl |
| XP-07 ™ | $C_{12-16}$ linear paraffin | 0.314 bbl/bbl |
| PERFOR MUL ™ | Emulsifier | 14 lb/bbl |
| EZ MUL ® NT | Emulsifier | 6 lb/bbl |
| Lime | pH Modifier | 2 lb/bbl |
| DRILTREAT ® | Wetting Agent | 3.5 lb/bbl |
| GELTONE ® II | Viscosifier | 4 lb/bbl |
| BARACARB ® 5 | Calcium Carbonate (weighting/bridging agent) | 26 lb/bbl |
| Calculated Density | | 1.72 SG (14.35 lb/gal) |

* bbl/bbl refers to barrel/barrel (used for adding liquids)
* lb/bbl refers to pounds per barrel (used for adding solids)
* SG refers to Specific Gravity The foregoing descriptions of specific compositions and methods of the present disclosure have been presented for purposes of illustration and description. They are not intended to be exhaustive or to limit the disclosure to the precise compositions and methods disclosed and obviously many modifications and variations are possible in light of the above teaching. The embodiments were chosen and described in order to best explain the principles of the disclosure and its practical application, to thereby enable others skilled in the art to best utilize the disclosure with various modifications as are suited to the particular use contemplated. It is intended that the scope of the disclosure be defined by the claims appended hereto and their equivalents.

What is claimed is:

1. An aqueous-based wellbore fluid comprising:
   (a) an aqueous solvent;
   (b) a weighting agent comprising one or more organic cationic tungstate, or molybdate, or silicate salts dissolved in the solvent;
   (c) one or more solid weighting agents; and
   wherein the one or more organic cationic tungstates, molybdates, and/or silicates is in an amount such that the density of the aqueous-based fluid composition is from about 15 to about 22 lbs/gal.

2. The wellbore fluid of claim 1, wherein the fluid is substantially free of lithium (Li), sodium (Na), potassium (K), rubidium (Rb), cesium (Cs), and francium (Fr) salts or ions.

3. The aqueous-based wellbore fluid according to claim 1, wherein the organic cation of the organic cationic tungstate, molybdate, or silicate salt is selected from the group consisting of cationic amines, cationic polyamines, ammonium compounds, phosphonium compounds, and amine oxides.

4. The aqueous-based wellbore fluid according to claim 3, wherein the organic cation is an aliphatic amine, a hydroxyl amine, a hydroxylamine derivative, a polyamine, guanidine, or a guanidine derivative.

5. The aqueous-based wellbore fluid according to claim 4, wherein the organic cation is ethanolamine, diethanolamine, triethanolamine, ethylenediamine, diethylenetriamine, or triethylenetetramine.

6. The aqueous-based wellbore fluid according to claim 1, further comprising at least one or more water-miscible organic liquids.

7. The aqueous-based wellbore fluid according to claim 6, wherein the one or more water-miscible organic liquids are selected from the group consisting of esters, amines, alcohols, polyols, and glycol ethers.

8. The aqueous-based wellbore fluid according to claim 1 having a pH of from 7 to 13.

9. The aqueous-based wellbore fluid according to claim 1, wherein the fluid is a well bore treatment fluid, a kill fluid, a packer fluid, or a thermally insulating fluid.

10. An oil-based emulsion comprising:
    a. an oily phase; and
    b. the aqueous-based wellbore fluid according to claim 1.

11. The oil-based emulsion according to claim 10, wherein the oily phase comprises at least one hydrocarbon-based oil.

12. The oil-based emulsion according to claim 10, further comprising one or more emulsifiers.

13. The oil-based emulsion according to claim 10, further comprising a glycol.

14. A method for drilling a well in a subterranean zone comprising drilling the well in the presence of the oil-based emulsion of claim 10.

15. A method for drilling a well in a subterranean zone comprising drilling the well in the presence of the aqueous-based wellbore fluid according to claim 1.

16. The aqueous-based wellbore fluid according to claim 1 further including one or more polymers.

17. The aqueous-based wellbore fluid according to claim 16, wherein the one or more polymers are selected from the group consisting of an acrylic acid polymer, an acrylic acid ester polymer; an acrylic acid derivative polymer, an acrylic acid homopolymer, an acrylic acid ester homopolymer, a poly(methyl acrylate), a poly (butyl acrylate), a poly(2-ethylhexyl acrylate), an acrylic acid ester co-polymer, a methacrylic acid derivative polymer, a methacrylic acid homopolymer, a methacrylic acid ester homopolymer, a poly(methyl methacrylate), a polyacrylamide homopolymer, an n-vinyl pyrolidone and polyacrylamide copolymer, a poly(butyl methacrylate), a poly(2-ethylhexyl methacrylate)), an n-vinyl pyrolidone, an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate copolymer, xanthan, diutan, starch, hydroxyethyl cellulose, carboxymethyl cellulose, polyanionic cellulose, and scleroglucan.

18. The aqueous-based wellbore fluid according to claim 17, wherein the one or more polymers is in an amount of from about 0.1 to about 15 wt. % of the fluid, based on the total weight of the fluid.

19. The aqueous-based wellbore fluid according to claim 17, wherein the one or more solid weighting agents are selected from the group consisting of barite, hematite, calcium carbonate, magnesium carbonate, iron carbonate, zinc carbonate, manganese tetraoxide, and ilmenite.

* * * * *